United States Patent
Abe et al.

(10) Patent No.: US 9,191,038 B2
(45) Date of Patent: Nov. 17, 2015

(54) WIRELESS BICYCLE COMMUNICATION APPARATUS AND WIRELESS BICYCLE COMMUNICATION SYSTEM

(71) Applicant: SHIMANO INC., Sakai (JP)

(72) Inventors: Ryuji Abe, Sakai (JP); Kazuhiro Takeda, Sakai (JP)

(73) Assignee: SHIMANO INC., Sakai (JP)

( * ) Notice: Subject to any disclaimer, the term of this patent is extended or adjusted under 35 U.S.C. 154(b) by 56 days.

(21) Appl. No.: 14/140,444

(22) Filed: Dec. 24, 2013

(65) Prior Publication Data

US 2015/0180517 A1    Jun. 25, 2015

(51) Int. Cl.
| | |
|---|---|
| *B62J 3/00* | (2006.01) |
| *B62J 6/00* | (2006.01) |
| *H04B 1/04* | (2006.01) |
| *G08C 17/00* | (2006.01) |
| *B62M 25/08* | (2006.01) |
| *G08C 19/00* | (2006.01) |
| *H04B 1/16* | (2006.01) |

(52) U.S. Cl.
CPC ............... *H04B 1/04* (2013.01); *B62M 25/08* (2013.01); *G08C 17/00* (2013.01); *G08C 19/00* (2013.01); *H04B 1/16* (2013.01)

(58) Field of Classification Search
CPC ............ B62J 99/00; B62M 6/45; B62M 9/04; B62M 25/08
USPC .............. 455/66.1, 90.1–90.2, 344–346, 351; 340/432
See application file for complete search history.

(56) References Cited

U.S. PATENT DOCUMENTS

| | | | |
|---|---|---|---|
| 7,522,033 B2 * | 4/2009 | Takamoto et al. | 340/456 |
| 7,760,078 B2 | 7/2010 | Miki et al. | |
| 7,761,212 B2 * | 7/2010 | Takebayashi | 701/51 |
| 8,336,400 B2 * | 12/2012 | Lassanske | 73/862.29 |
| 8,655,561 B2 * | 2/2014 | Kitamura | 701/51 |
| 8,781,680 B2 * | 7/2014 | Ichida et al. | 701/37 |
| 8,882,122 B2 * | 11/2014 | Emura et al. | 280/200 |
| 2004/0000990 A1 * | 1/2004 | Takeda et al. | 340/432 |
| 2009/0170660 A1 * | 7/2009 | Miglioranza | 482/1 |
| 2013/0054088 A1 | 2/2013 | Kitamura | |
| 2013/0144464 A1 * | 6/2013 | Dorogusker et al. | 701/1 |
| 2014/0102237 A1 * | 4/2014 | Jordan et al. | 74/473.12 |

FOREIGN PATENT DOCUMENTS

| | | |
|---|---|---|
| JP | 2011-088518 | 5/2011 |
| JP | 2013-047657 | 3/2013 |

* cited by examiner

*Primary Examiner* — Simon Nguyen
(74) *Attorney, Agent, or Firm* — Mori & Ward, LLP

(57) ABSTRACT

A wireless bicycle communication apparatus comprises an information receiver and a wireless transmitter. The information receiver is configured to receive first information and second information from a first bicycle component and a second bicycle component. The first information relates to the first bicycle component. The second information relates to the second bicycle component. The information receiver is configured to receive at least one of the first information and the second information via an electrical communication wiring. The wireless transmitter is configured to periodically transmit wireless signals based on the first information and the second information.

22 Claims, 14 Drawing Sheets

WIRELESS BICYCLE COMMUNICATION APPARATUS AND WIRELESS BICYCLE COMMUNICATION SYSTEM

BACKGROUND OF THE INVENTION

1. Field of the Invention

The present invention relates to a wireless bicycle communication apparatus and a wireless bicycle communication system.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In recent years, some bicycles are provided with electric bicycle components.

SUMMARY OF THE INVENTION

In accordance with a first aspect of the present invention, a wireless bicycle communication apparatus comprises an information receiver and a wireless transmitter. The information receiver is configured to receive first information and second information from a first bicycle component and a second bicycle component. The first information relates to the first bicycle component. The second information relates to the second bicycle component. The information receiver is configured to receive at least one of the first information and the second information via an electrical communication wiring. The wireless transmitter is configured to periodically transmit wireless signals based on the first information and the second information.

In accordance with a second aspect of the present invention, the wireless bicycle communication apparatus according to the first aspect is configured so that the electrical communication wiring includes an electrical cable. The information receiver includes a first connection terminal configured to be detachably connected to the electrical cable.

In accordance with a third aspect of the present invention, the wireless bicycle communication apparatus according to the second aspect is configured so that the electrical communication wiring includes an additional electrical cable. The information receiver includes a second connection terminal configured to be detachably connected to the additional electrical cable.

In accordance with a fourth aspect of the present invention, the wireless bicycle communication apparatus according to the first aspect is configured so that the first bicycle component is configured to be in a state changeable among a plurality of states. The second bicycle component is configured to be in a state changeable among a plurality of states. The first information includes information indicating a state of the first bicycle component. The second information includes information indicating a state of the second bicycle component.

In accordance with a fifth aspect of the present invention, the wireless bicycle communication apparatus according to the first aspect is configured so that the wireless transmitter includes a signal generating part and a signal transmitting part. The signal generating part is configured to generate the wireless signals based on the first information and the second information. The signal transmitting part is configured to periodically transmit the wireless signals generated by the signal generating part.

In accordance with a sixth aspect of the present invention, the wireless bicycle communication apparatus according to the fifth aspect is configured so that the signal generating part is configured to encrypt the first information and the second information to generate encrypted wireless signals. The signal transmitting part is configured to periodically transmit the encrypted wireless signals.

In accordance with a seventh aspect of the present invention, the wireless bicycle communication apparatus according to the first aspect is configured so that the first bicycle component comprises a transmission configured to shift gears. The first information includes shift information indicating which gear is selected by the transmission. The information receiver is configured to receive the shift information as the first information from the transmission via the electrical communication wiring.

In accordance with an eighth aspect of the present invention, the wireless bicycle communication apparatus according to the first aspect is configured so that the second bicycle component comprises a battery device configured to supply electric power to the first bicycle component. The second information includes battery information indicating a battery residual capacity of the battery device. The information receiver is configured to receive the battery information as the second information from the battery device via the electrical communication wiring.

In accordance with a ninth aspect of the present invention, the wireless bicycle communication apparatus according to the first aspect further comprises a first detector configured to detect third information indicating a rotational state of a bicycle wheel. The wireless transmitter is configured to periodically transmit the wireless signals based on the third information.

In accordance with a tenth aspect of the present invention, the wireless bicycle communication apparatus according to the first aspect further comprises a second detector configured to detect fourth information indicating a rotational state of a bicycle crank. The wireless transmitter is configured to periodically transmit the wireless signals based on the fourth information.

In accordance with an eleventh aspect of the present invention, a wireless bicycle communication system comprises a first bicycle component, a second bicycle component, an electrical communication wiring and a wireless bicycle communication apparatus. The wireless bicycle communication apparatus comprises an information receiver and a wireless transmitter. The information receiver is configured to receive first information and second information from the first bicycle component and the second bicycle component. The first information relates to the first bicycle component. The second information relates to the second bicycle component. The information receiver is configured to receive at least one of the first information and the second information via the electrical communication wiring. The wireless transmitter is configured to periodically transmit wireless signals based on the first information and the second information.

In accordance with a twelfth aspect of the present invention, the wireless bicycle communication system according to the eleventh aspect is configured so that the electrical communication wiring includes an electrical cable. The information receiver includes a first connection terminal configured to be detachably connected to the electrical cable.

In accordance with a thirteenth aspect of the present invention, the wireless bicycle communication system according to the twelfth aspect is configured so that the electrical communication wiring includes an additional electrical cable. The information receiver includes a second connection terminal configured to be detachably connected to the additional electrical cable.

In accordance with a fourteenth aspect of the present invention, the wireless bicycle communication system according to the eleventh aspect is configured so that the first bicycle component is configured to be in a state changeable among a plurality of states. The second bicycle component is configured to be in a state changeable among a plurality of states. The first information includes information indicating a state of the first bicycle component. The second information includes information indicating a state of the second bicycle component.

In accordance with a fifteenth aspect of the present invention, the wireless bicycle communication system according to the eleventh aspect is configured so that the wireless transmitter includes a signal generating part and a signal transmitting part. The signal generating part is configured to generate the wireless signals based on the first information and the second information. The signal transmitting part is configured to periodically transmit the wireless signals generated by the signal generating part.

In accordance with a sixteenth aspect of the present invention, the wireless bicycle communication system according to the fifteenth aspect is configured so that the signal generating part is configured to encrypt the first information and the second information to generate encrypted wireless signals. The signal transmitting part is configured to periodically transmit the encrypted wireless signals.

In accordance with a seventeenth aspect of the present invention, the wireless bicycle communication system according to the eleventh aspect is configured so that the first bicycle component comprises a transmission configured to shift gears. The first information includes shift information indicating which gear is selected by the transmission. The information receiver is configured to receive the shift information as the first information from the transmission via the electrical communication wiring.

In accordance with an eighteenth aspect of the present invention, the wireless bicycle communication system according to the seventeenth aspect is configured so that the second bicycle component comprises a battery device configured to supply electric power to the first bicycle component. The second information includes battery information indicating a battery residual capacity of the battery device. The information receiver is configured to receive the battery information as the second information from the battery device via the electrical communication wiring.

In accordance with a nineteenth aspect of the present invention, the wireless bicycle communication system according to the eleventh aspect further comprises a first detector configured to detect third information indicating a rotational state of a bicycle wheel. The wireless transmitter is configured to periodically transmit the wireless signals based on the third information.

In accordance with a twentieth aspect of the present invention, the wireless bicycle communication system according to the eleventh aspect further comprises a second detector configured to detect fourth information indicating a rotational state of a bicycle crank. The wireless transmitter is configured to periodically transmit the wireless signals based on the fourth information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
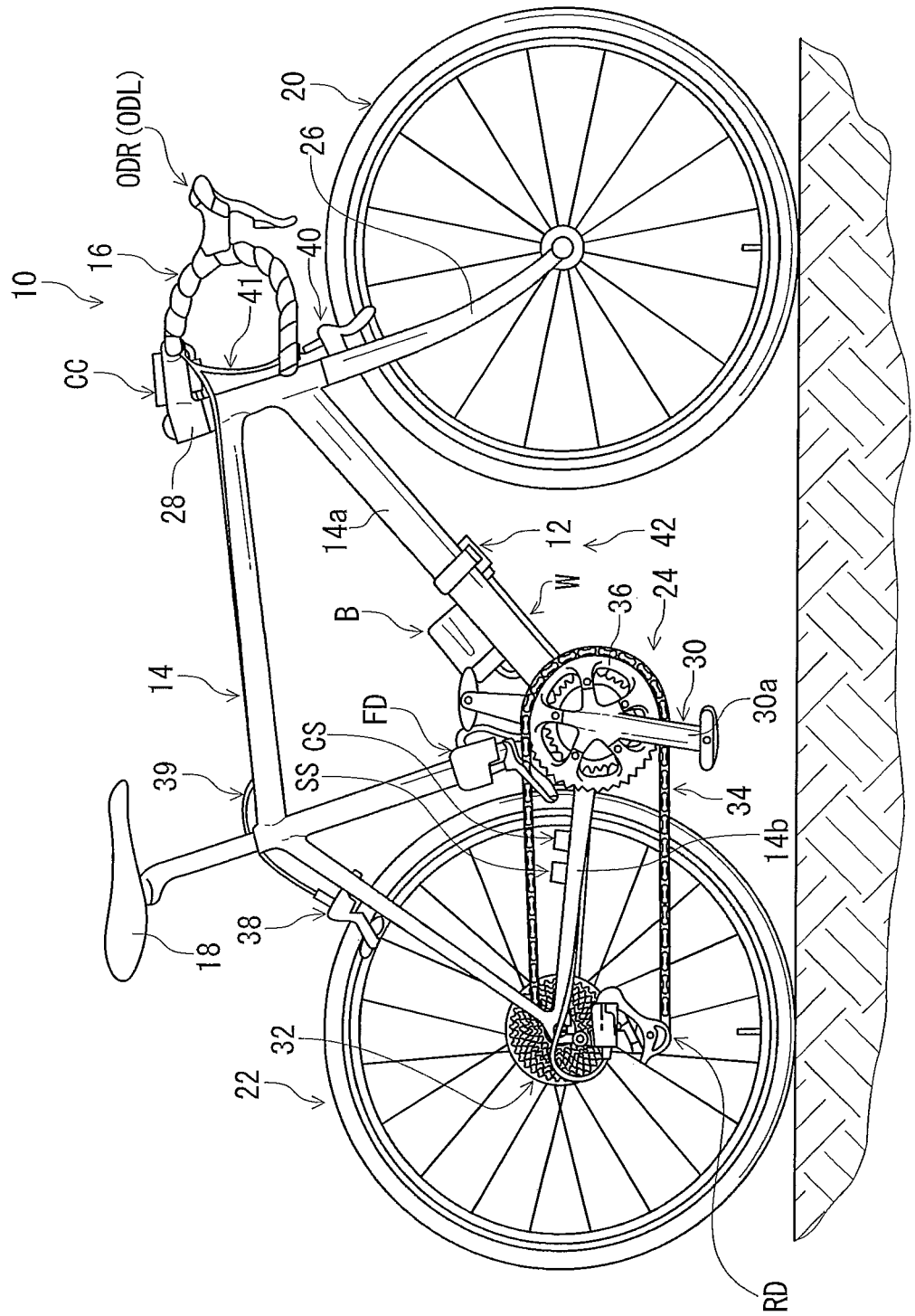
FIG. 1 is a side elevational view of a bicycle equipped with a wireless bicycle communication apparatus in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a wireless bicycle communication apparatus 12 in accordance with the first embodiment. While the wireless bicycle communication apparatus 12 is illustrated in connection with a road bike, the wireless bicycle communication apparatus 12 can be used with other types of bicycles as needed and/or desired.

As seen in FIG. 1, the bicycle 10 includes a bicycle frame 14, a handlebar 16, a saddle 18, a front wheel 20, a rear wheel 22 and a drive train 24. The wireless bicycle communication apparatus 12 is detachably attached to a down tube 14a of the bicycle frame 14. The handlebar 16 is coupled to a front fork 26 of the bicycle frame 14 via a stem 28. The front fork 26 rotatably supports the front wheel 20. The bicycle frame 14 rotatably supports the rear wheel 22. Each of the front wheel 20 and the rear wheel 22 constitutes a bicycle wheel. The drive train 24 is configured to convert the rider's pedaling force into driving force. The drive train 24 includes a bicycle crank 30, a rear sprocket assembly 32, a bicycle chain 34. The bicycle crank 30 is rotatably mounted on a bottom bracket (not shown) of the bicycle frame 14. The bicycle crank 30 includes a front sprocket assembly 36. The rear sprocket assembly 32 is mounted to a rear axle of the rear wheel 22. The bicycle chain 34 is arranged on the front sprocket assembly 36 and the rear sprocket assembly 32 so as to extend therebetween.

In the present application, the following directional terms "front", "rear", "forward", "rearward", "left", "right", "transverse", "upward" and "downward" as well as any other similar directional terms refer to those directions which are determined on the basis of the rider who sits on the saddle 18 of the bicycle 10 with facing the handlebar 16, for example. Accordingly, these terms, as utilized to describe bicycle components of the bicycle 10, should be interpreted relative to the bicycle 10 as used in an upright riding position on a horizontal surface.

As seen in FIG. 1, the drive train 24 further includes a transmission FD and a transmission RD. The transmission FD is a front derailleur configured to shift the bicycle chain 34 between sprockets of the front sprocket assembly 36. In the illustrated embodiment, the front sprocket assembly 36 includes two sprockets corresponding to two shift positions. The transmission RD is a rear derailleur configured to shift the bicycle chain 34 between sprockets of the rear sprocket assembly. In the illustrated embodiment, the rear sprocket assembly 32 includes eleven sprockets corresponding to eleven shift positions. The transmissions FD and RD are the front derailleur and the rear derailleur in the illustrated embodiment; however, the transmissions FD and RD can be a bicycle transmission other than the front and rear derailleurs. The transmissions FD and RD will be described later.

The bicycle 10 further includes a left operating device ODL and a right operating device ODR. FIG. 1 depicts only the right operating device ODR. The left operating device ODL and the right operating device ODR are mounted to the handlebar 16. The left operating device ODL is operatively connected to a rear brake 38 via an operation cable 39. The left operating device ODL is electrically connected to the transmission FD via an electrical communication wiring W. The right operating device ODR is operatively connected to a front brake 40 via an operation cable 41. The right operating device ODR is electrically connected to the transmission RD via the electrical communication wiring W. Since the left operating device ODL and the right operating device ODR include structures which have been known in the bicycle field, they will not be described and/or illustrated in detail herein for the sake of brevity.

The bicycle 10 includes a battery device B as an electric power source. The battery device B is configured to supply electric power (e.g., a prescribed voltage) to the transmission FD, the transmission RD, the wireless bicycle communication apparatus 12, the left operating device ODL and the right operating device ODR.

The bicycle 10 further includes a wireless bicycle communication system 42 configured to wirelessly transmit information to a cyclocomputer CC. The cyclocomputer CC is detachably attached to the stem 28 and configured to display information relating to various bicycle components. The wireless bicycle communication system 42 comprises a first bicycle component, a second bicycle component, the electrical communication wiring W and the wireless bicycle communication apparatus 12.

In the illustrated embodiment, the first bicycle component comprises the transmissions FD and RD configured to shift gears. The transmission FD is configured to be in a state changeable among the two shift positions, for example. The transmission RD is configured to be in a state changeable among the eleven shift positions, for example. Namely, the first bicycle component is configured to be in a state changeable among a plurality of states. The first bicycle component comprises the transmissions FD and RD in the illustrated embodiment; however, the first bicycle component can comprise at least one of the transmissions FD and RD and other bicycle components. For example, the first bicycle component can comprise an internal transmission hub assembly. Possible other examples of the first or second bicycle component include a suspension and a height adjustable seatpost assembly.

As seen in FIG. 1, the second bicycle component comprises the battery device B configured to supply electric power to the first bicycle component. A charged state of the battery device B is changeable among a plurality of charged states defined between a fully charged state and an empty state. Namely, the second bicycle component is configured to be in a state changeable among a plurality of states. The second bicycle components can comprise an electric power source other than the battery device B. In the illustrated embodiment, the second bicycle component comprises the battery device B; however, the second bicycle component can comprise at least one of the battery device B and other bicycle components.

The bicycle 10 further includes a speed sensor SS and a cadence sensor CS. The speed sensor SS and the cadence sensor CS are detachably attached to a chain stay 14b of the bicycle frame 14. The speed sensor SS is configured to detect a rotational state of the bicycle wheel. In the illustrated embodiment, the speed sensor SS is configured to detect a rotational speed of the rear wheel 22. The speed sensor SS detects the rotational speed of the rear wheel 22 using a magnet (not shown) attached to a spoke of the rear wheel 22, for example. The speed sensor SS is configured to wirelessly transmit the detected rotational speed of the rear wheel 22 to the cyclocomputer CC.

The cadence sensor CS is configured to detect a rotational state of a bicycle crank 30. In the illustrated embodiment, the cadence sensor CS is configured to detect a rotational speed of the bicycle crank 30. The cadence sensor CS detects the rotational speed of the bicycle crank 30 using a magnet attached to a right crank arm 30a of the bicycle crank 30, for example. The cadence sensor CS is configured to wirelessly transmit the detected rotational speed of the bicycle crank 30 to the cyclocomputer CC. The cadence sensor CS is a separate component from the speed sensor SS; however, the speed sensor SS and the cadence sensor CS can be integrally provided with each other as a single unitary component if needed and/or desired. Furthermore, at least one of the speed sensor SS and the cadence sensor CS can be omitted from the bicycle 10 if needed and/or desired.

Figure 2:
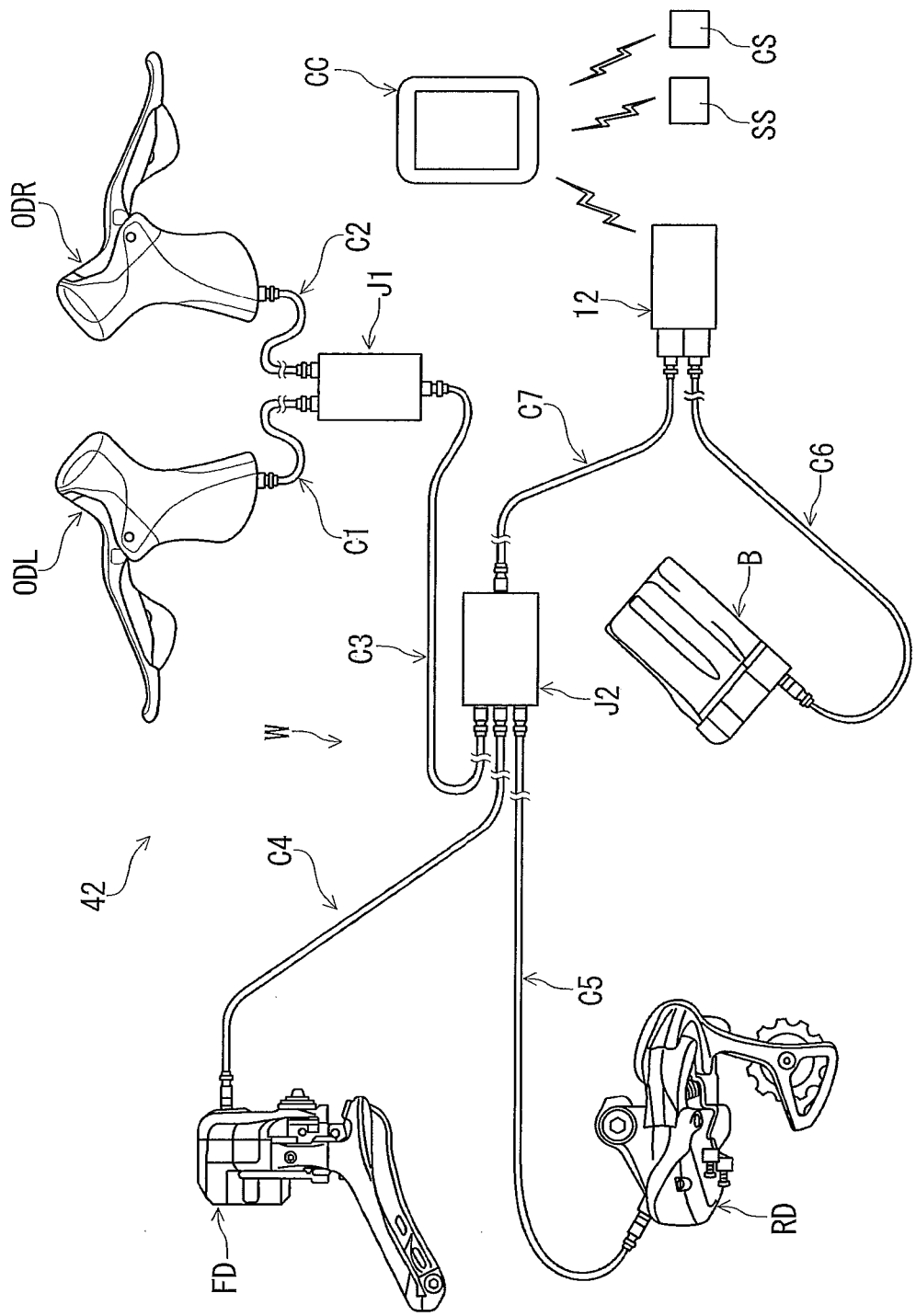
FIG. 2 is a schematic diagram showing one exemplary configuration of a wireless bicycle communication system in accordance with the first embodiment.

Referring to FIG. 2, a schematic diagram showing one exemplary configuration of the wireless bicycle communication system 42 is illustrated. As seen in FIG. 2, the bicycle components FD, RD, B, 12, ODL and ODR are electrically connected to each other via the electrical communication wiring W. In the illustrated embodiment, the electrical communication wiring W includes electrical communication cables C1 to C7 and electrical wiring junctions J1 and J2. Each of the electrical communication cables C1 to C7 includes electrical connectors at both ends thereof. The electrical connectors are configured to be detachably connected to each of the electrical wiring junctions J1 and J2 and the wireless bicycle communication apparatus 12. In the illustrated embodiment, the left operating device ODL is electrically connected to the electrical wiring junction J1 via the electrical communication cable C1. The right operating device ODR is electrically connected to the electrical wiring junction J1 via the electrical communication cable C2. The electrical wiring junction J1 is electrically connected to the electrical wiring junction J2 via the electrical communication cable C3. The transmission FD is electrically connected to the electrical wiring junction J2 via the electrical communication cable C4. The transmission RD is electrically connected to the electrical wiring junction J2 via the electrical communication cable C5. The battery device B is electrically connected to the wireless bicycle communication apparatus 12 via the electrical communication cable C6. The electrical wiring junction J2 is connected to the wireless bicycle communication apparatus 12 via the electrical communication cable C7. The wiring configuration of the wireless bicycle communication system 42 is not limited to the above configuration illustrated in FIG. 2. For example, the battery device B can be electrically connected to one of the electrical wiring junctions J1 and J2 via an electrical communication cable. Instead of the battery device B, one of the transmissions FD and RD can be electrically connected to the wireless bicycle communication apparatus 12 via an electrical communication cable.

Figure 3:
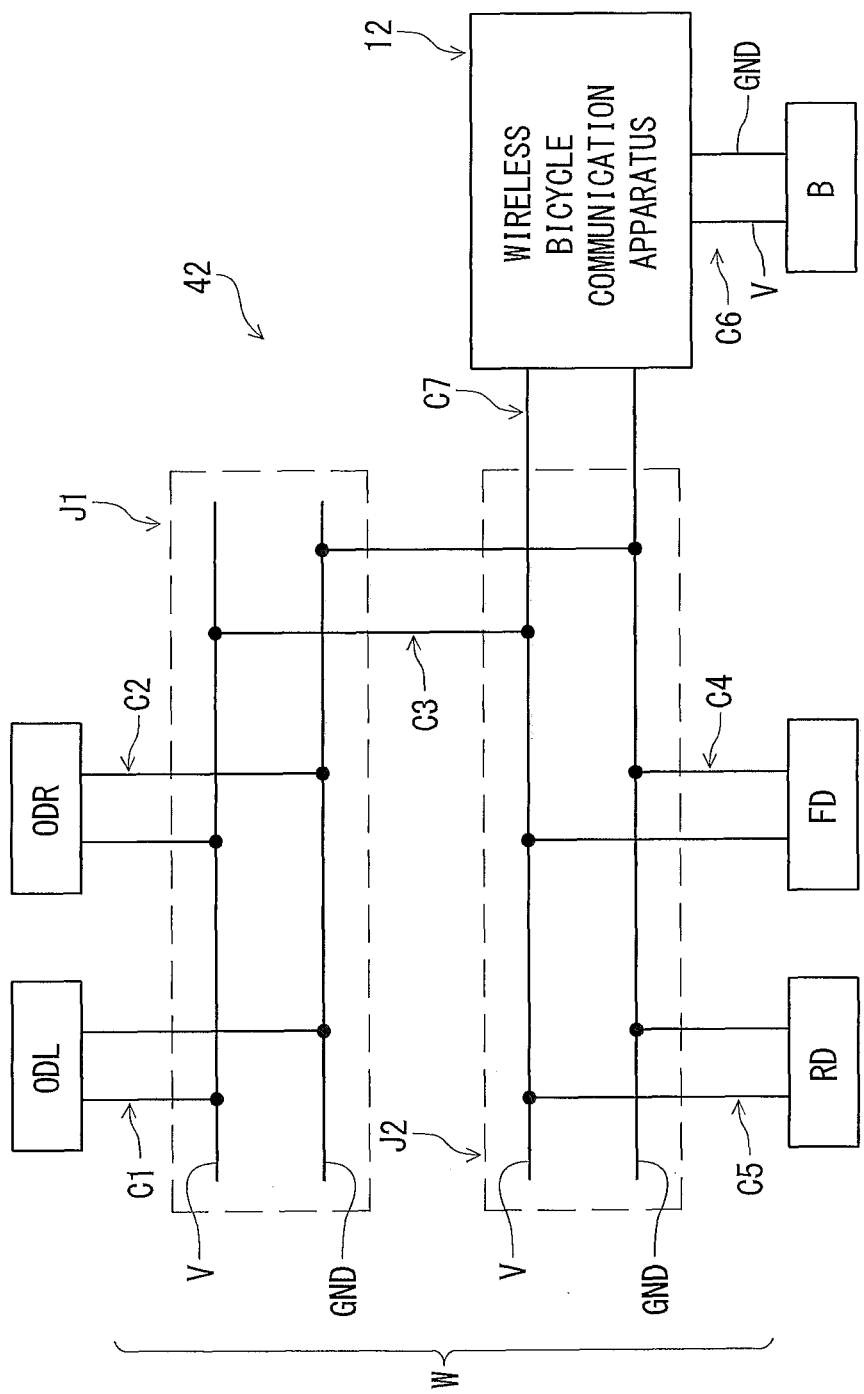
FIG. 3 is a block diagram showing an electric component connection structure of the wireless bicycle communication system in accordance with the first embodiment.

Referring to FIG. 3, an electric component connection structure of the wireless bicycle communication system 42 is illustrated. In the illustrated embodiment, the bicycle components FD, RD, B, 12, ODL and ODR can communicate with each other via the electrical communication wiring W using power line communication technology. More specifically, each of the electrical communication cables C1 to C7 includes a ground line GND and a voltage line V that are detachably connected to a serial bus that is formed by communication interfaces and the electrical wiring junctions J1 and J2. In the illustrated embodiment, the bicycle components FD, RD, B, 12, ODL and ODR can all communicate with each other through the voltage line V using the power line communication technology.

The power line communication technology is used for communicating between electrical components. Power line communication (PLC) carries data on a conductor that is also used simultaneously for electric power transmission or electric power distribution to the electric component. In the illustrated embodiment, the electric power is supplied from the battery device B to the bicycle components FD, RD, 12, ODL and ODR via the electrical communication wiring W. Furthermore, the wireless bicycle communication apparatus 12 can receive information signals from the bicycle components FD, RD, B, ODL and ODR via the electrical communication wiring W using the PLC.

The wireless bicycle communication apparatus 12 is configured to wirelessly transmit signals to the cyclocomuputer CC based on the information signals which are transmitted from the bicycle components FD, RD and B via the electrical communication wiring W. Furthermore, the transmissions FD and RD are configured to receive control signals from the left operating device ODL and the right operating device ODR via the electrical communication wiring W, respectively.

The PLC uses unique identifying information such as a unique identifier that is assigned to each of the bicycle components FD, RD, B, 12, ODL and ODR. Each of the bicycle components FD, RD, B, 12, ODL and ODR includes a memory in which the unique identifying information is stored. Based on the unique identifying information, each of the bicycle components FD, RD, B, 12, ODL and ODR can recognize, based on the unique identifying information, information signals which are necessary for itself among information signals transmitted via the electrical communication wiring W. For example, the wireless bicycle communication apparatus 12 can recognize information signals transmitted from the transmissions FD and RD and the battery device B via the electrical communication wiring W. Instead of using the PLC technology, however, separate signal wires can be provided for transmitting data in addition to the ground wire GND and the voltage wire V if needed and/or desired.

Figure 4:
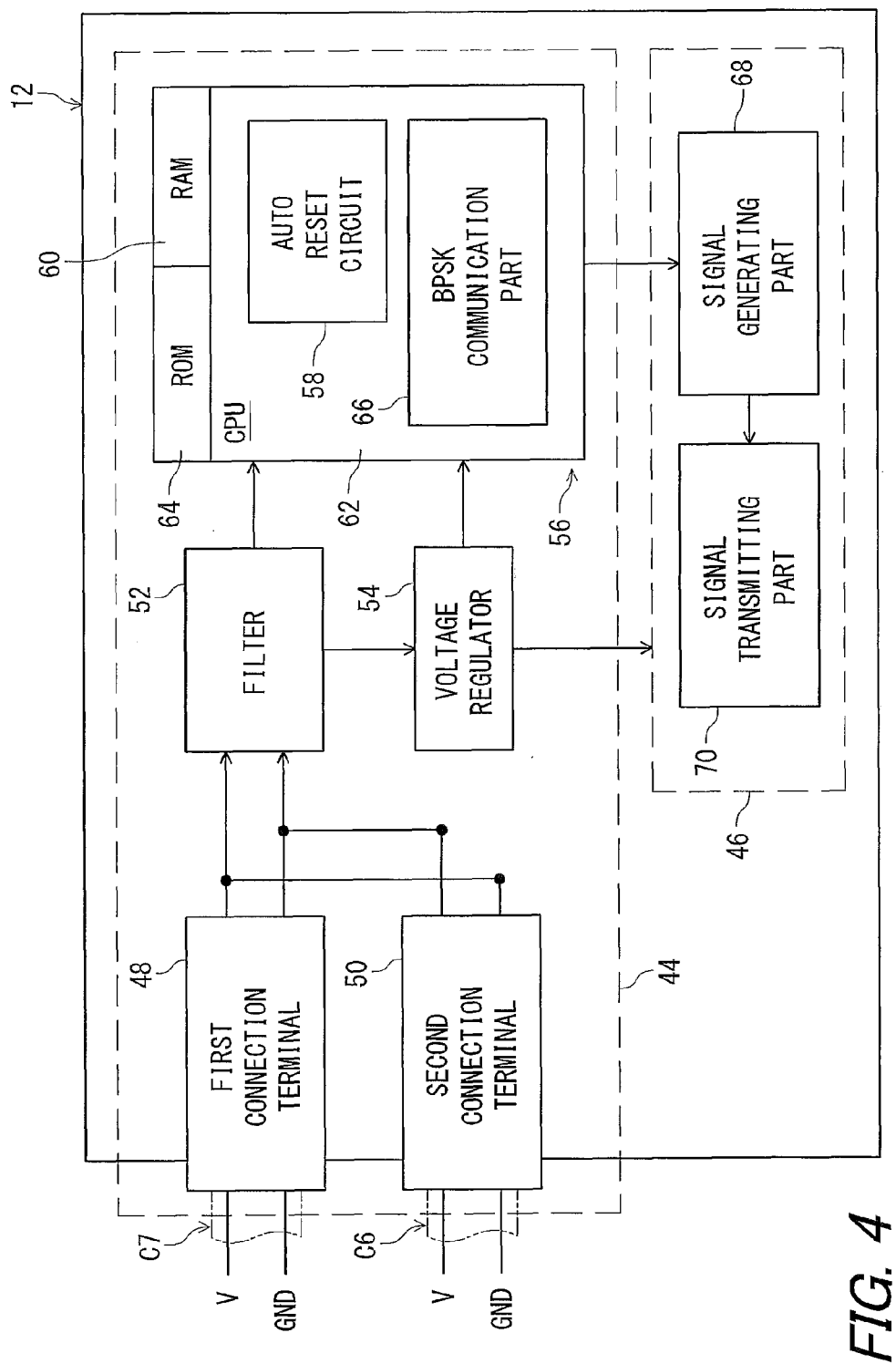
FIG. 4 is a schematic block diagram of the wireless bicycle communication apparatus in accordance with the first embodiment.

As seen in FIG. 4, the wireless bicycle communication apparatus 12 comprises an information receiver 44 and a wireless transmitter 46. The information receiver 44 is configured to receive first information and second information from the first bicycle component (or the transmissions FD and RD) and the second bicycle component (or the battery device B). The first information relates to the first bicycle component (or the transmissions FD and RD). The second information relates to the second bicycle component (or the battery device B). The information receiver 44 is configured to receive at least one of the first information and the second information via an electrical communication wiring W. In the illustrated embodiment, the information receiver 44 is configured to receive the first information and the second information via the electrical communication wiring W from the transmissions FD and RD and the battery device B The first information includes information indicating a state of the first bicycle component. The first information includes shift information indicating which gear is selected by the transmission. In the illustrated embodiment, the first information includes the shift information indicating which gear is selected by each of the transmissions FD and RD. The information receiver 44 is configured to receive the shift information as the first information from the transmission via the electrical communication wiring W. More specifically, the first information includes front shift information and rear shift information. The front shift information indicates which gear is selected by the transmission FD. The rear shift information indicates which gear is selected by the transmission RD. The information receiver 44 is configured to receive the front shift information and the rear shift information via the electrical communication wiring W.

The second information includes information indicating a state of the second bicycle component. In the illustrated embodiment, the second information includes battery information indicating a battery residual capacity of the battery device B. The information receiver 44 is configured to receive the battery information as the second information from the battery device B via the electrical communication wiring W.

The information receiver 44 includes a first connection terminal 48 configured to be detachably connected to an electrical cable. In the illustrated embodiment, the first connection terminal 48 is detachably connected to the electrical communication cable C7. Namely, the electrical communication wiring W includes the electrical communication cable C7 as the electrical cable. The first connection terminal 48 is configured to be detachably connected to the electrical cable; however, the first connection terminal 48 and an electrical communication cable can be integrally provided with each other as a single unitary component if needed and/or desired.

As seen in FIG. 4, the information receiver 44 includes a second connection terminal 50 configured to be detachably connected to an additional electrical cable. In the illustrated embodiment, the second connection terminal 50 is detachably connected to the electrical communication cable C6. Namely, the electrical communication wiring W includes the electrical communication cable C6 as the additional electrical cable. The second connection terminal 50 is configured to be detachably connected to the additional electrical cable; however, the second connection terminal 50 and an electrical communication cable can be integrally provided with each other as a single unitary component if needed and/or desired. Furthermore, one of the first connection terminal 48 and the second connection terminal 50 can be omitted from the wireless bicycle communication apparatus 12 if needed and/or desired. The second connection terminal 50 allows the wireless bicycle communication apparatus 12 to be selectively connected to an available connection terminal of the other component via an electrical cable. Accordingly, it is possible to select a mounting position of the wireless bicycle communication apparatus 12.

The information receiver 44 further includes a filter 52, a voltage regulator 54 and a controller 56. The filter 52 is configured to separate input signals to the power source voltage and information signals. The filter 52 is configured to separate the input power source voltage into the power source voltage and the information signals. The voltage regulator 54 is configured to regulate the power source voltage to a level at which various components of the wireless bicycle communication apparatus 12 can properly operate. The filter 52 is configured to output the information signals to the controller 56.

The controller 56 includes an auto reset circuit 58, a random access memory (RANI) 60, a central processing unit (CPU) 62 and a read-only memory (ROM) 64. The auto reset circuit 58 is configured to control voltage outputted from the voltage regulator 54 such that the CPU 62 can properly operate. The RAM 60 is configured to temporarily store data such as the information signals. The ROM 64 is configured to store software to perform various functions for processing the information signals outputted from the filter 52. The CPU 62 is configured to perform various functions by reading the software stored in the ROM 64. More specifically, the controller 56 includes a BPSK communication part 66 as one of functional blocks. The BPSK communication part 66 is configured to receive the information signals from the filter 52 using binary phase shift keying (BPSK). More specifically, the BPSK communication part 66 is configured to convert the information signals outputted from the filter 52 into digital signals using the BPSK. The converted digital signals are temporarily stored in the RAM 60. In the illustrated embodiment, the converted digital signals indicate the first information (e.g., the shift information) and the second information (e.g., the battery information).

The wireless transmitter 46 is configured to periodically transmit wireless signals based on the first information and the second information. The wireless transmitter 46 is configured to periodically transmit wireless signals to the cyclocomputer CC using a predetermined wireless communication protocol. For example, the wireless transmitter 46 is configured to periodically transmit wireless signals to the cyclocomputer CC four times per second. In the illustrated embodiment, for example, the wireless transmitter 46 is composed of an ANT module configured to transmit wireless signals to the cyclocomputer CC using a predetermined ANT protocol.

As seen in FIG. 4, the wireless transmitter 46 includes a signal generating part 68 and a signal transmitting part 70. The signal generating part 68 is configured to generate the wireless signals based on the first information (e.g., the shift information) and the second information (e.g., the battery information). The signal generating part 68 is configured to superimpose digital signals on carrier wave using a predetermined wireless communication protocol (e.g., the ANV protocol) to generate the wireless signals. The signal transmitting part 70 is configured to periodically transmit the wireless signals generated by the signal generating part 68. In the illustrated embodiment, the signal generating part 68 is configured to encrypt the first information (e.g., the shift information) and the second information (e.g., the battery information) to generate encrypted wireless signals. The signal generating part 68 is configured to encrypt digital signals stored in the RAM using a predetermined cryptographic key. The signal transmitting part 70 is configured to periodically transmit the encrypted wireless signals. As seen in FIG. 2, the cyclocomputer CC is configured to wirelessly receive the information signals from the wireless bicycle communication apparatus 12. The cyclocomputer CC is configured to decrypt the encrypted wireless signals based on the predetermined cryptographic key. The cyclocomputer CC is configured to display the first information and the second information on a display based on the decrypted wireless signals. The signal generating part 68 is configured to encrypt the first information and the second information; however, the signal generating part 68 can be configured to generate wireless signals without encrypting if needed and/or desired.

Figure 5:
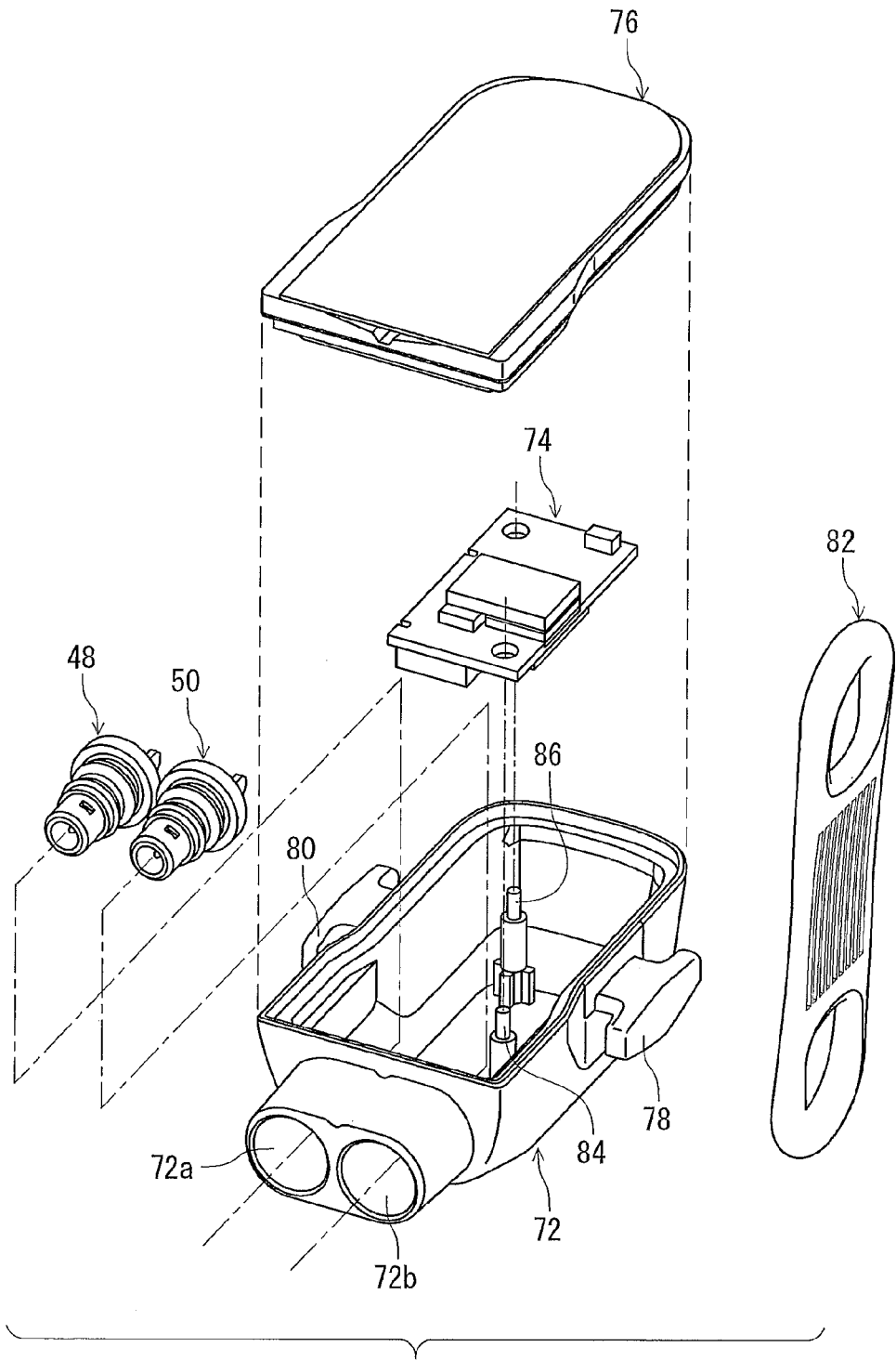
FIG. 5 is an exploded perspective view of the wireless bicycle communication apparatus in accordance with the first embodiment.

Referring to FIG. 5, an exploded perspective view of the wireless bicycle communication apparatus 12 is illustrated. As seen in FIG. 5, the wireless bicycle communication apparatus 12 includes a housing 72, a substrate 74, a cover 76, a first protrusion 78, a second protrusion 80 and a rubber band 82. The substrate 74 is provided in an inside space of the housing 72 and is secured to supporting portions 84 and 86 of the housing 72. Various electrical parts (e.g., the wireless transmitter 46 and a part of the information receiver 44) are provided on the substrate 74. The first connection terminal 48 is provided in a through-hole 72a of the housing 72 and is electrically connected to the substrate 74. The second connection terminal 50 is provided in a through-hole 72b of the housing 72 and is electrically connected to the substrate 74.

The cover 76 is secured to the housing 72 to seal off the inside space of the housing 72. The first protrusion 78 and the second protrusion 80 protrude from the housing 72. The second protrusion 80 is provided on an opposite side of the first protrusion 78 with respect to the housing 72. One end of the rubber band 82 is hooked to the first protrusion 78 and another end of the rubber band 82 is hooked to the second protrusion 80 for mounting the wireless bicycle communication apparatus 12 to the bicycle frame 14 (FIG. 1).

Figure 6:
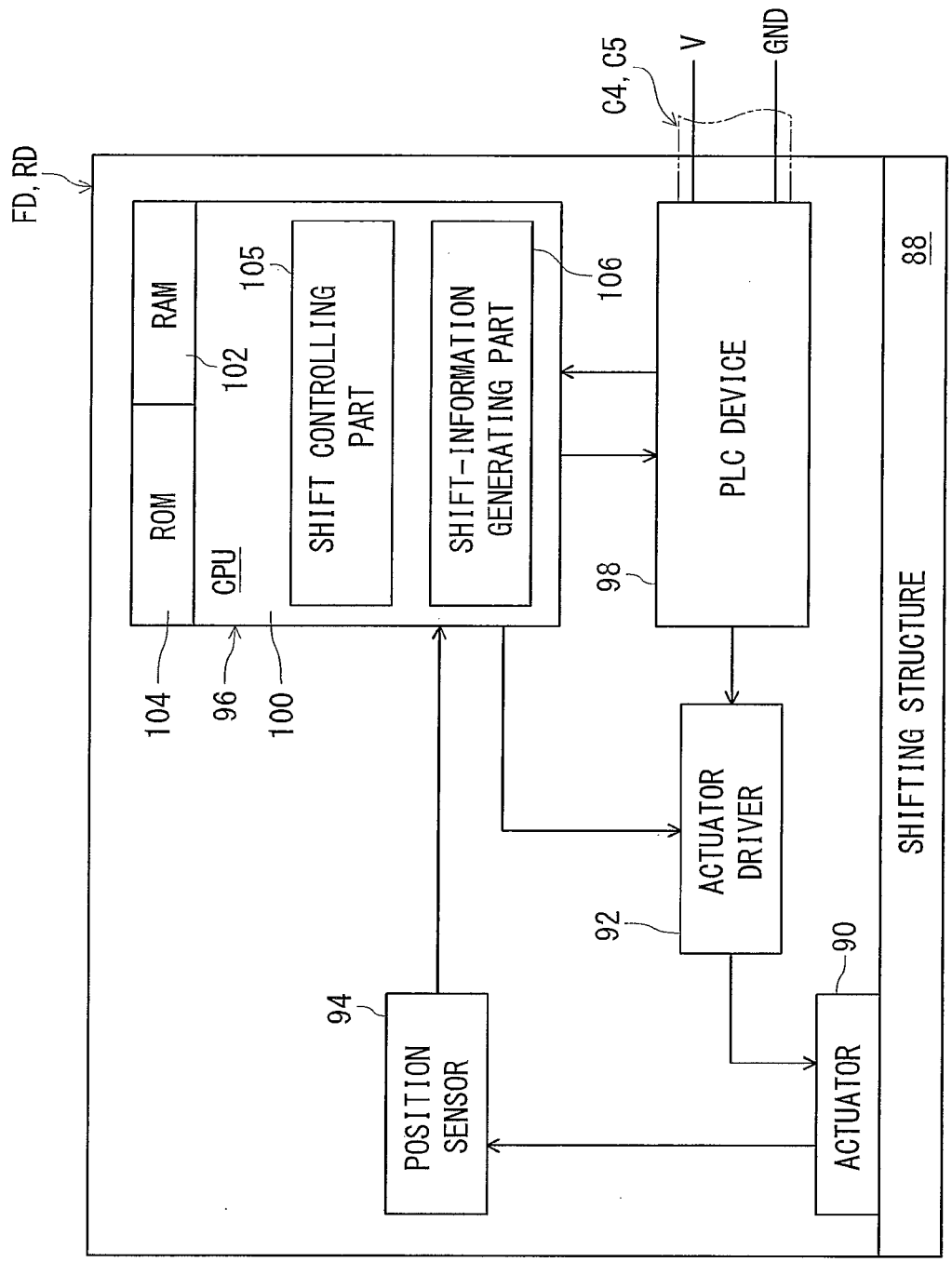
FIG. 6 is a schematic block diagram of a transmission provided in the bicycle illustrated in FIG. 1.

Referring to FIG. 6, a schematic block diagram of the transmissions FD and RD is illustrated. As seen in FIG. 6, each of the transmissions FD and RD includes a shifting structure 88, an actuator 90, an actuator driver 92, a position sensor 94, a microcomputer 96 and a PLC device 98. The shifting structure 88 includes a guide portion to shift the bicycle chain 34 (FIG. 1) in a transverse direction of the bicycle 10. The actuator 90 is configured to actuate the shifting structure 88 to move the guide portion. In the illustrated embodiment, the actuator 90 is a reversible motor configured to generate a driving force for shifting gears. The actuator 90 can be other types of devices such as a solenoid. The actuator driver 92 is configured to drive the actuator 90 in response to control signals from the microcomputer 96. The position sensor 94 is configured to detect a current shift position of the shifting structure 88 via the actuator 90. The position sensor 94 is a rotary encoder configured to detect a rotational absolute position and a rotational relative position of a rotor provided in the reversible motor, for example.

The microcomputer 96 includes a CPU 100, a RAM 102 and a ROM 104. The RAM 102 is configured to temporarily store the current shift position detected by the position sensor 94. The current shift position among the two shift positions is temporarily stored in the RAM 102 of the transmission FD as the front shift information. The current shift position among the eleven shift positions is temporarily stored in the RAM 102 of the transmission RD as the rear shift information. The ROM 104 is configured to store the predetermined shift position of the transmission. More specifically, the two shift positions of the transmission FD are stored in the ROM 104 in advance. The eleven shift positions of the transmission RD are stored in the ROM 104 in advance.

The ROM 104 is further configured to store software to perform various functions for processing signals which are outputted from the PLC device 98 and the position sensor 94. The CPU 100 is configured to perform various functions by reading the software stored in the ROM 104. More specifically, the microcomputer 96 includes a shift controlling part 105 and a shift-information generating part 106 as functional blocks.

The shift controlling part 105 is configured to control the actuator 90 via the actuator driver 92 based on control signals outputted from the left operating device ODL and the current shift position detected by the position sensor 94. The shift controlling part 105 is configured to actuate the shifting structure 88 using data stored in the RAM 102 and the ROM 104 from the current shift position to a next shift position corresponding to the control signals of the operating device (the left operating device ODL or the right operating device ODR).

The shift-information generating part 106 is configured to generate information signals indicating the current shift position based on the latest shift position stored in the RAM 102. In the transmission FD, the shift-information generating part 106 is configured to generate information signals as the front shift information based on the latest shift position stored in the RAM 102 of the transmission FD. In the transmission RD, the shift-information generating part 106 is configured to generate information signals as the rear shift information based on the latest shift position stored in the RAM 102 of the transmission RD.

The PLC device 98 is a part of a PLC system that is configured to execute two-way communications with each of the bicycle components FD, RD, B, 12, ODL and ODR via the electrical communication wiring W. The PLC device 98 is configured to superimpose the information signals indicating the shift information on the power source voltage flowing in the electrical communication wiring W. In the illustrated embodiment, the shift information indicating the current shift positions of the transmissions FD and RD is superimposed on the power source voltage for transmitting the shift information to the bicycle components 12, ODL and ODR. Furthermore, the PLC device 98 is configured to receive control signals superimposed on the power source voltage from the left operating device ODL and the right operating device ODR via the electrical communication wiring W. Since the transmission FD and the transmission RD include structures which have been known in the bicycle field, they will not be described and/or illustrated in detail herein for the sake of brevity.

Figure 7:
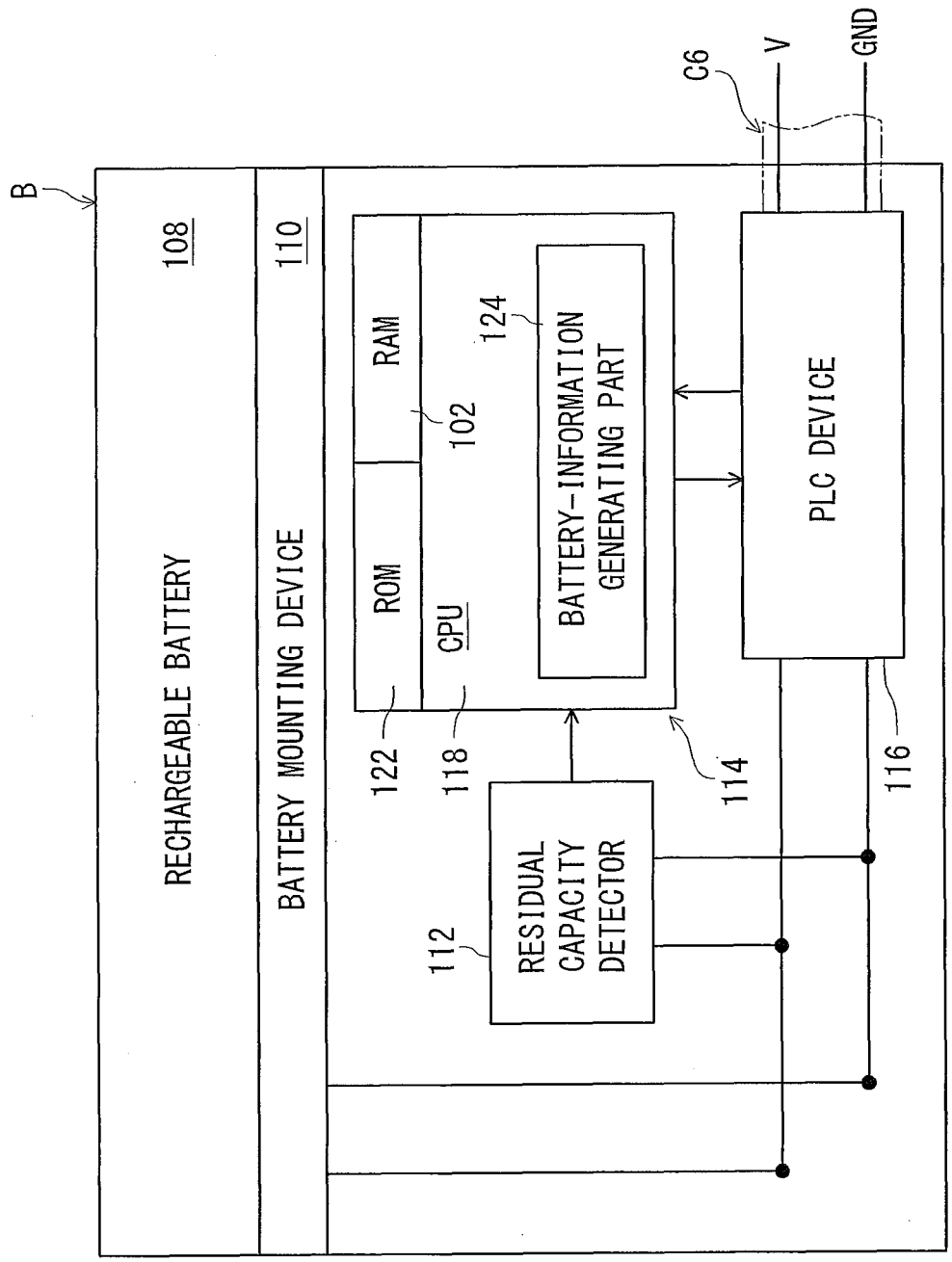
FIG. 7 is a schematic block diagram of a battery device provided in the bicycle illustrated in FIG. 1.

Referring to FIG. 7, a schematic block diagram of the battery device B is illustrated. As seen in FIG. 7, the battery device B includes a rechargeable battery 108, a battery mounting device 110, a residual capacity detector 112, a microcomputer 114 and a PLC device 116. The rechargeable battery 108 is detachably mounted on the battery mounting device 110 to be electrically connected to the battery mounting device 110. The rechargeable battery 108 can be, for example, a nickel hydrogen battery or a lithium ion battery; however, the rechargeable battery 108 can be other type of batteries.

The battery mounting device 110 is mounted on the bicycle frame 14 (FIG. 1) and is electrically connected to the wireless bicycle communication apparatus 12 via the electrical communication cable C6 (FIG. 2). As seen in FIG. 7, the residual capacity detector 112 is configured to detect the battery residual capacity of the rechargeable battery 108. The microcomputer 114 includes a CPU 118, a RAM 120 and a ROM 122. The RAM 120 is configured to temporarily store the battery residual capacity detected by the residual capacity detector 112. The ROM 122 is configured to store software to perform various functions for processing the information signals which are outputted from the residual capacity detector 112 and the PLC device 116. The CPU 118 is configured to perform various functions by reading the software stored in the ROM 122. More specifically, the microcomputer 114 includes a battery-information generating part 124 as one of functional blocks. The battery-information generating part 124 is configured to generate information signals as the battery information based on the residual capacity detected by the residual capacity detector 112.

The PLC device 116 is a part of the PLC system that is configured to execute two-way communications with each of the bicycle components FD, RD, B, 12, ODL and ODR via the electrical communication wiring W. The PLC device 116 is configured to superimpose the information signals indicating the battery information on the power source voltage. The battery information indicating the battery residual capacity of the battery device B is transmitted to the bicycle components FD, RD, 12, ODL and ODR via the electrical communication wiring W.

As described above, the wireless bicycle communication apparatus 12 receives the current shift positions of the transmissions FD and RD and the battery residual capacity of the battery device B via the electrical communication wiring W. The wireless bicycle communication apparatus 12 is configured to periodically transmit wireless signals indicating the current shift positions and the battery residual capacity to the cyclocomputer CC for displaying the current shift positions and the battery residual capacity.

Figure 8:
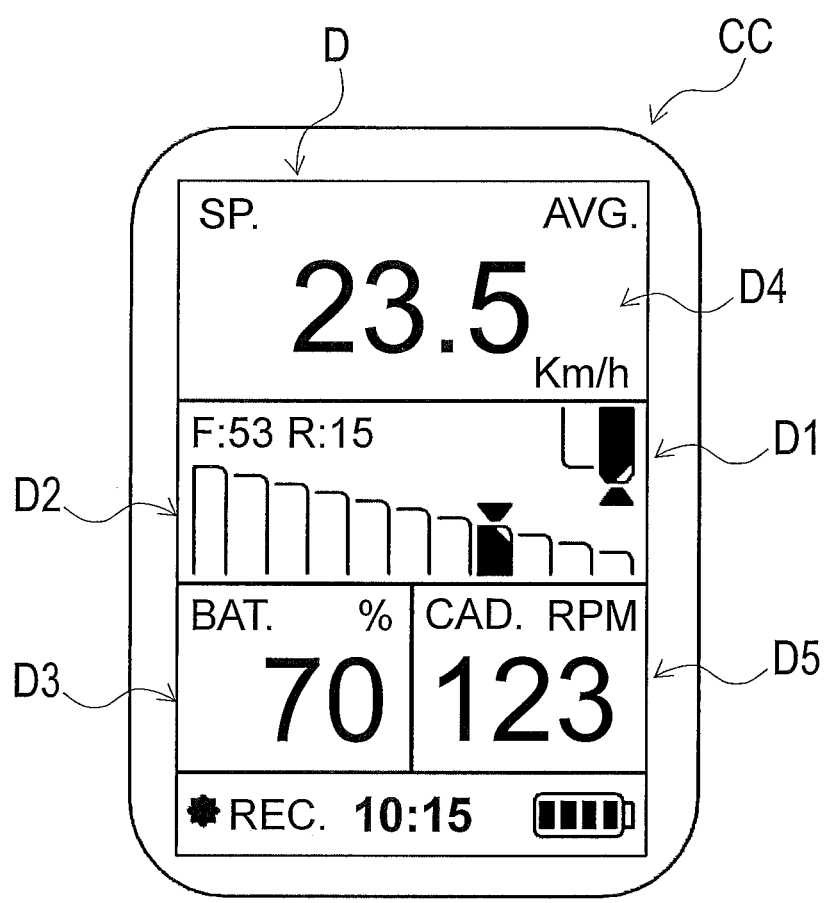
FIG. 8 illustrates a display configuration of a cyclocomputer.

Referring to FIG. 8, one example of a display configuration of the cyclocomputer CC is illustrated. As seen in FIG. 8, the cyclocomputer CC is configured to display the information which is periodically wirelessly transmitted from the wireless bicycle communication apparatus 12. The cyclocomputer CC includes a display D configured to display information wirelessly transmitted from the wireless bicycle communication apparatus 12. In the illustrated embodiment, the cyclocomputer CC displays the front shift information D1, the rear shift information D2 and the battery information D3 on the display D. The front shift information D1 indicates which gear is selected by the transmission FD. The rear shift information D2 indicates which gear is selected by the transmission RD. The battery information D3 indicates the battery residual capacity of the battery device B. Furthermore, the cyclocomputer CC displays speed information D4 and cadence information D5 on the display D. The speed information D4 is calculated based on the rotational speed wirelessly transmitted from the speed sensor SS. The cadence information indicates the rotational speed wirelessly transmitted from the cadence sensor CS.

With the wireless bicycle communication apparatus 12 according to the first embodiment, the wireless transmitter 46 is configured to periodically transmit wireless signals to the cyclocomputer CC based on the first information and the second information which are received by the information receiver 44 via the electrical communication wiring W. Accordingly, it is possible to wirelessly transmit information relating to various bicycle components of the bicycle 10 to the cyclocomputer CC.

In the illustrated embodiment, the wireless bicycle communication apparatus 12 directly receives the first information and the second information from the bicycle components. The wireless bicycle communication apparatus 12 can, however, receive the first information and the second information from a master unit configured to collect the first information and the second information from the first bicycle component and the second bicycle component. The master unit is configured to collect, arrange and manage information outputted from the bicycle components. In this case, the bicycle components are electrically connected to the master unit via an electrical cable, and the master unit is electrically connected to the wireless bicycle communication apparatus 12 via an electrical cable. Namely, the wireless bicycle communication apparatus 12 can receive the first information and the second information from the first bicycle component and the second bicycle component via the master unit. For example, the first information is transmitted from the first bicycle component to the master unit every time a state (e.g., a shift position) of the first bicycle component changes. Similarly, the second information is transmitted from the second bicycle component to the master unit every time a state (e.g., a battery residual capacity) of the second bicycle component changes. The master unit is configured to periodically transmit the first information and the second information to the wireless bicycle communication apparatus 12. The master unit can be integrated into the battery device B, for example.

Second Embodiment

A wireless bicycle communication system 142 in accordance with the second embodiment will be described below referring to FIGS. 9 and 10. The wireless bicycle communication system 142 has the same configuration as the wireless bicycle communication system 42 except that a wireless bicycle communication apparatus 112 corresponding to the wireless bicycle communication apparatus 12 is integrated into one of the bicycle components. Thus, elements having substantially the same function as those in the first embodiment will be numbered the same here, and will not be described again in detail here for the sake of brevity.

Figure 9:
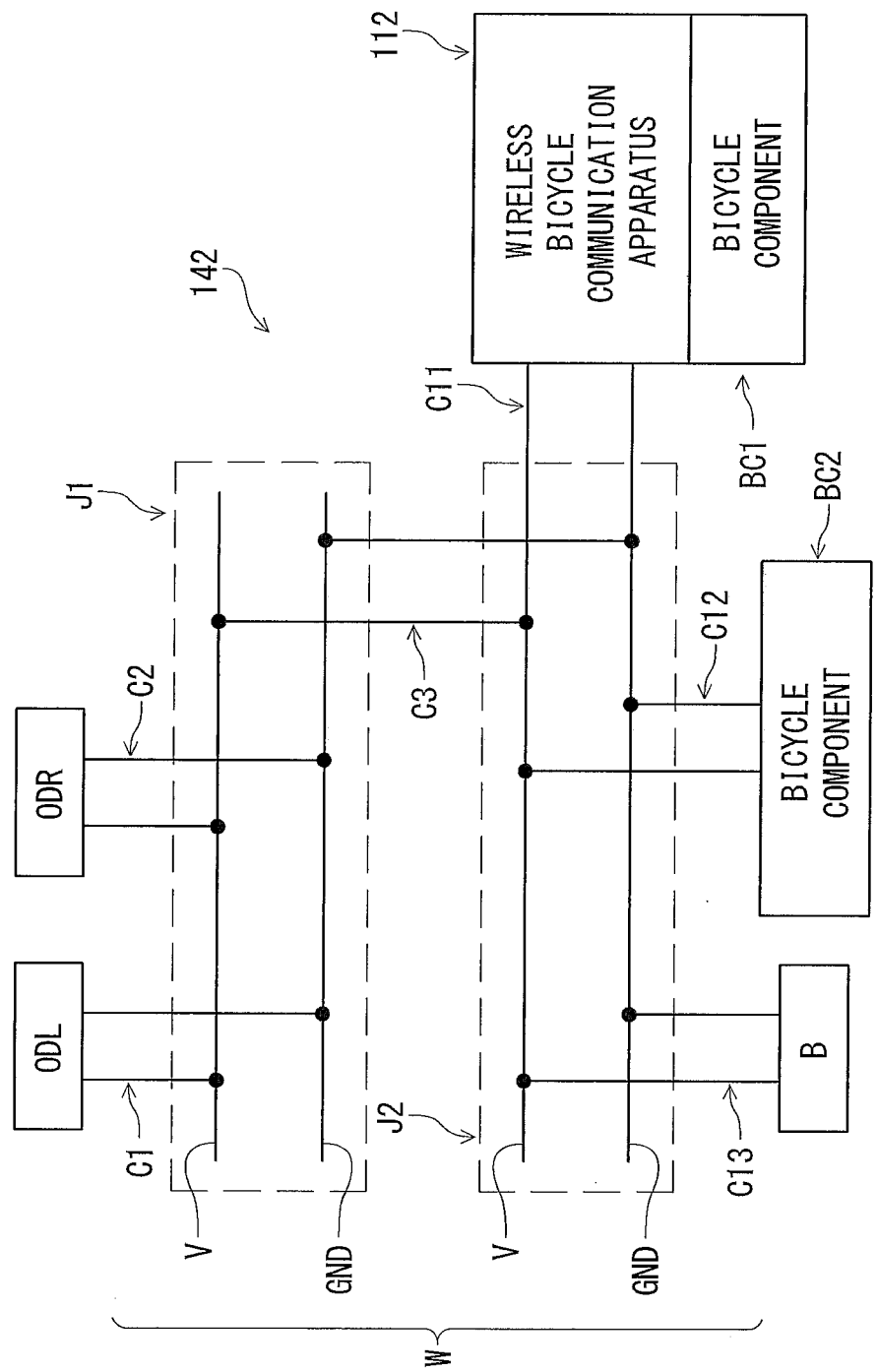
FIG. 9 is a block diagram showing an electric component connection structure of a wireless bicycle communication system in accordance with a second embodiment.

As seen in FIG. 9, the wireless bicycle communication apparatus 112 according to the second embodiment is integrated into a bicycle component BC1. The bicycle components BC1 can be one of the transmissions FD and RD. A bicycle component BC2 can be another of the transmissions FD and RD. In the illustrated embodiment, the wireless bicycle communication apparatus 112 according to the second embodiment is electrically connected to the communication wiring junction J2 via an electrical communication cable C11 of the electrical communication wiring W. Unlike the first embodiment, the wireless bicycle communication apparatus 112 is electrically connected to the bicycle component BC1 via an internal electric circuit without via the electrical communication wiring W. The bicycle component BC2 is electrically connected to the communication wiring junction J2 via an electrical communication cable C12 of the electrical communication wiring W. The battery device B is electrically connected to the communication wiring junction J2 via an electrical communication cable C13 of the electrical communication wiring W.

Figure 10:
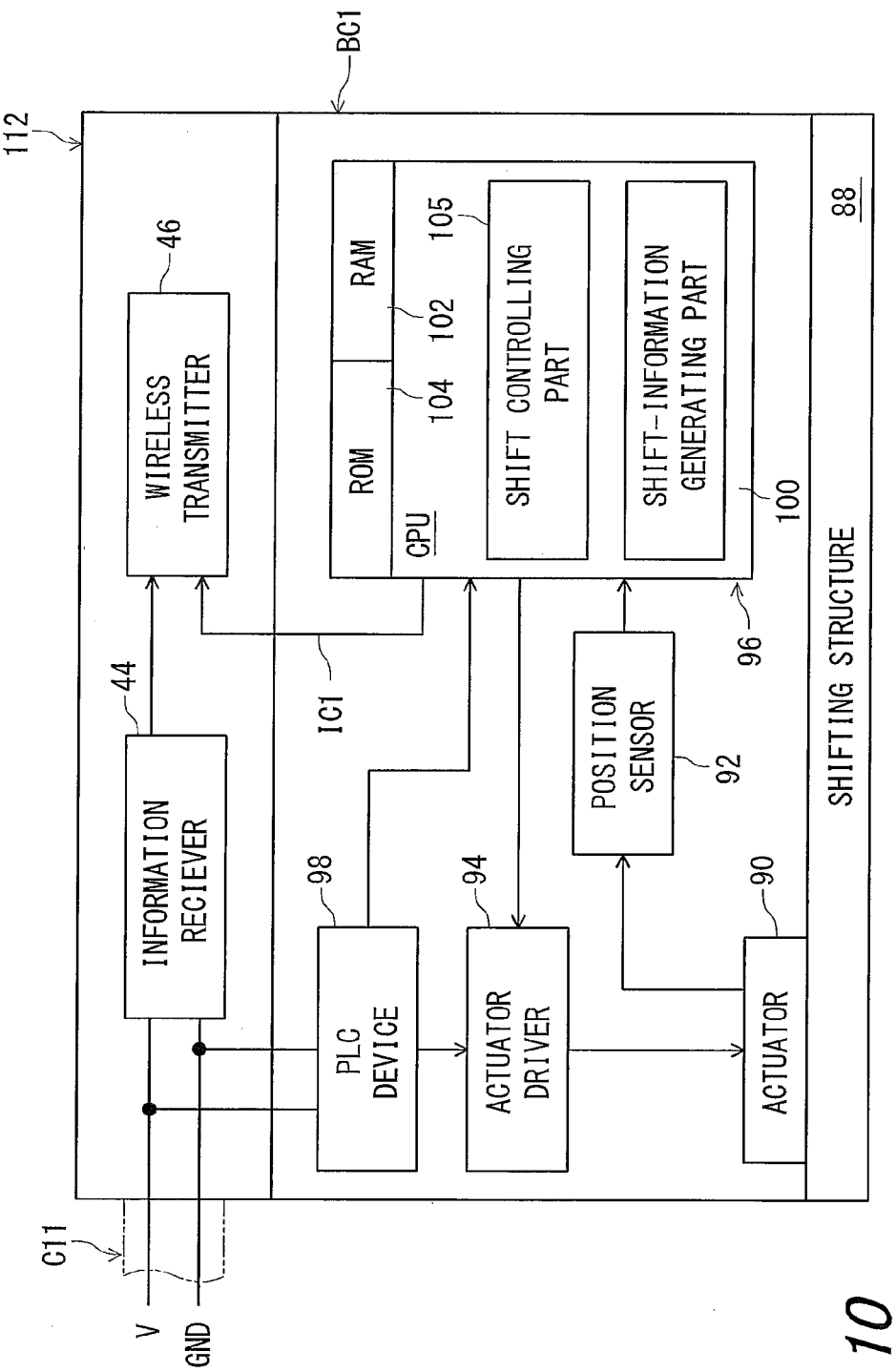
FIG. 10 is a schematic block diagram of a wireless bicycle communication apparatus in accordance with the second embodiment.

As seen FIG. 10, the wireless bicycle communication apparatus 112 is configured to receive the shift information from the bicycle component BC1 via an internal electric circuit IC1. In the illustrated embodiment, the wireless transmitter 46 of the wireless bicycle communication apparatus 112 directly receives the first information (the shift information) from the microcomputer 96 of the bicycle component BC1 without via the electrical communication wiring W. The wireless bicycle communication apparatus 112 is configured to receive the second information (the battery information) from the battery device B via the electrical communication wiring W. Namely, the information receiver 44 of the wireless bicycle communication apparatus 112 is configured to receive the first information without via the electrical communication wiring W, while the information receiver 44 is configured to receive the second information via the electrical communication wiring W.

With the wireless bicycle communication apparatus 112 according to the second embodiment, it is possible to wirelessly transmit information relating to various bicycle components of the bicycle 10 to the cyclocomputer CC as well as the first embodiment.

The wireless bicycle communication apparatus 112 and the bicycle component BC1 include the information receiver 44 and the PLC device 98 as a communication interface; however, the information receiver 44 can be shared with the bicycle component BC1 as the communication interface of the bicycle component BC1. Furthermore, the microcomputer 96 can be integrated into the wireless bicycle communication apparatus 112.

Third Embodiment

A wireless bicycle communication system 242 in accordance with the third embodiment will be described below referring to FIGS. 11 and 12. The wireless bicycle communication system 242 has the same configuration as the wireless bicycle communication system 42 except that a wireless bicycle communication apparatus 212 corresponding to the wireless bicycle communication apparatus 12 is integrated into one of the bicycle components. Thus, elements having substantially the same function as those in the first embodiment will be numbered the same here, and will not be described and/or illustrated again in detail here for the sake of brevity.

Figure 11:
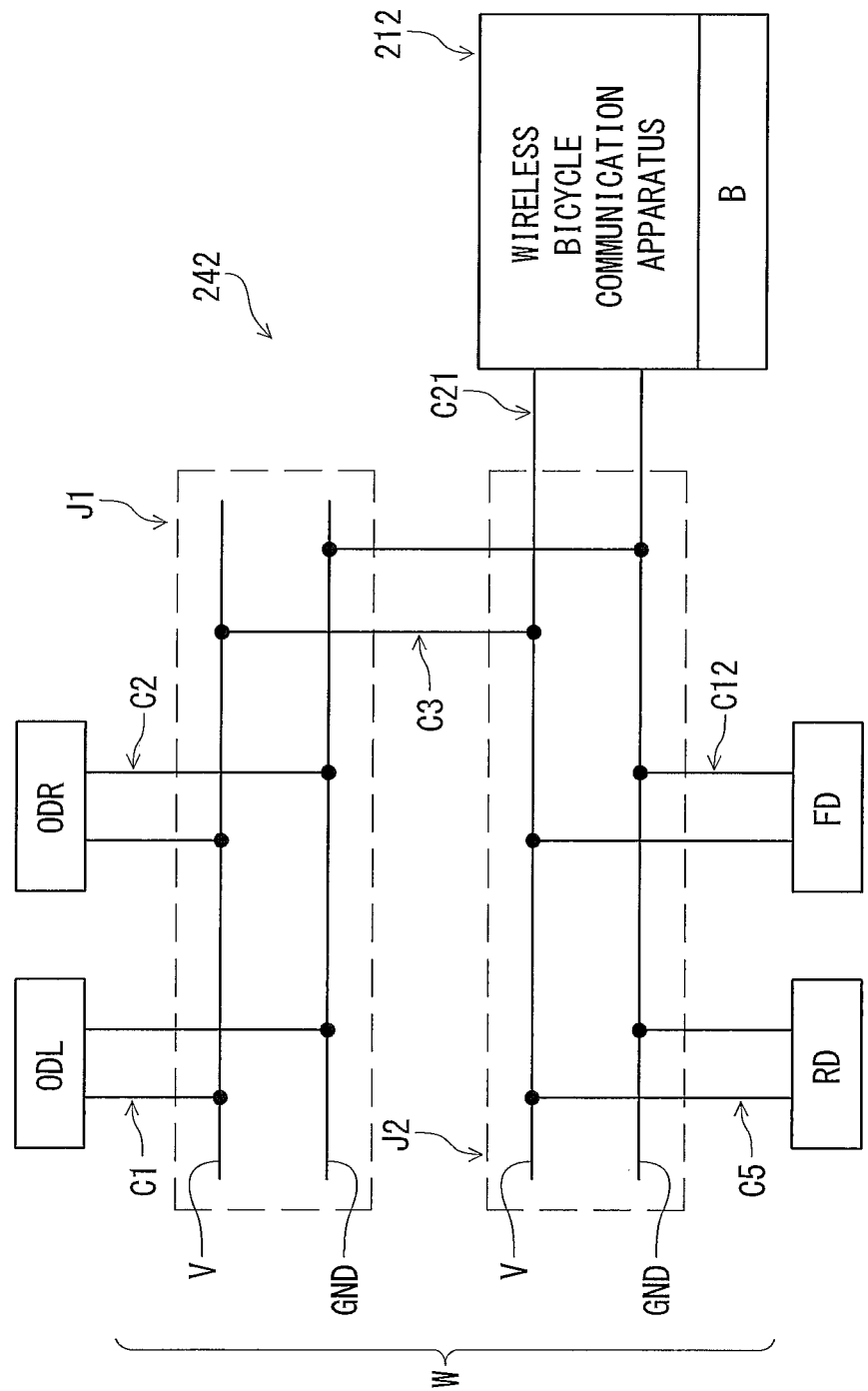
FIG. 11 is a block diagram showing an electric component connection structure of a wireless bicycle communication system in accordance with a third embodiment.

As seen in FIG. 11, the wireless bicycle communication apparatus 212 according to the third embodiment is integrated into the battery device B. In the illustrated embodiment, the wireless bicycle communication apparatus 212 according to the third embodiment is electrically connected to the communication wiring junction J2 via an electrical communication cable C21 of the electrical communication wiring W. Unlike the first embodiment, the wireless bicycle communication apparatus 212 is electrically connected to the battery device B via an internal electric circuit without via the electrical communication wiring W. The transmission FD is electrically connected to the communication wiring junction J2 via the electrical communication cable C4. The transmission RD is electrically connected to the communication wiring junction J2 via the electrical communication cable C5.

Figure 12:
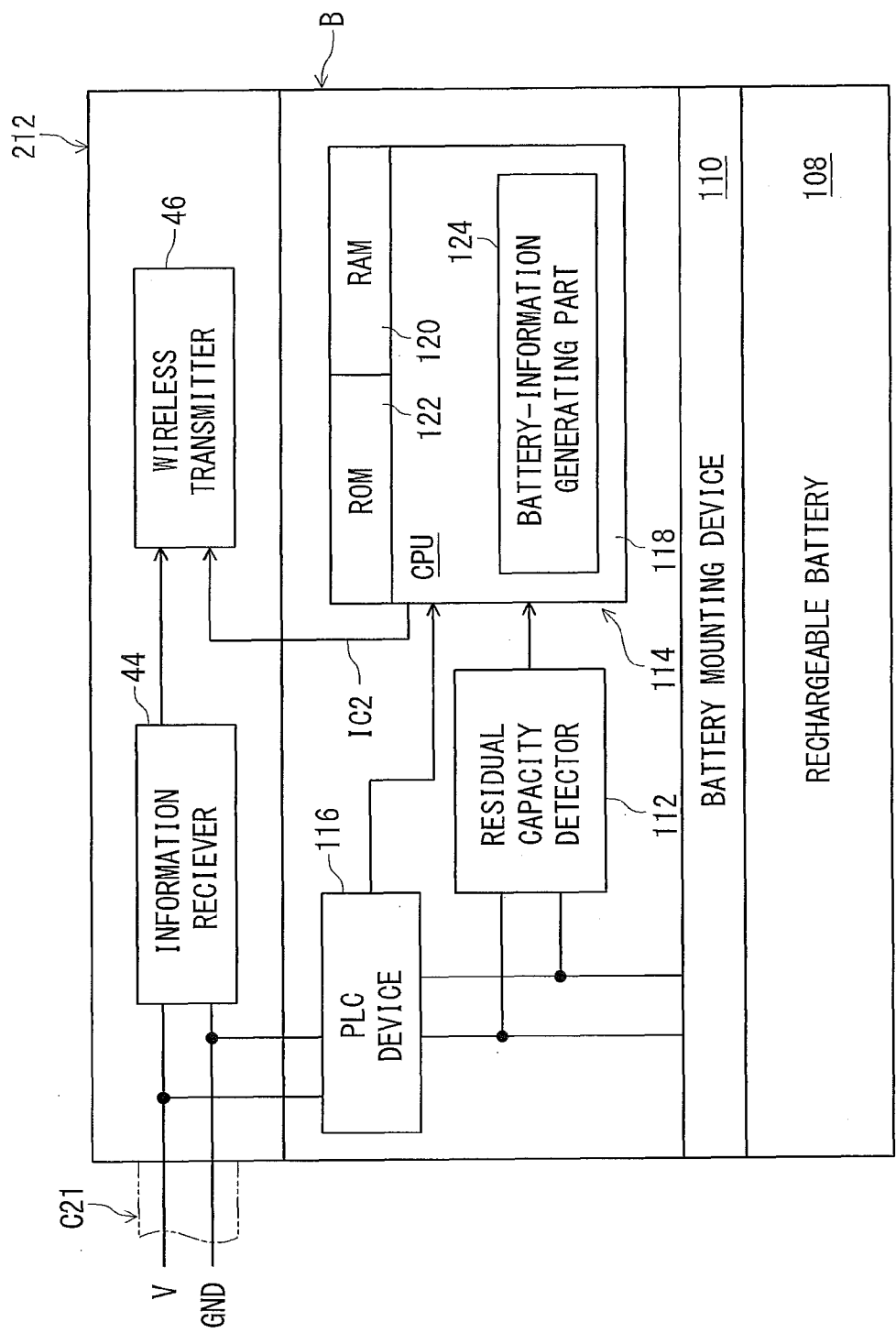
FIG. 12 is a schematic block diagram of a wireless bicycle communication apparatus in accordance with the third embodiment.

As seen FIG. 12, the wireless bicycle communication apparatus 212 is configured to receive the battery information from the battery device B via an internal electric circuit IC2. In the illustrated embodiment, the wireless transmitter 46 of the wireless bicycle communication apparatus 212 directly receives the second information (e.g., the battery information) from the microcomputer 114 of the battery device B without via the electrical communication wiring W. The wireless bicycle communication apparatus 212 is configured to receive the first information (e.g., the shift information) from the transmissions FD and RD via the electrical communication wiring W. Namely, the information receiver 44 of the wireless bicycle communication apparatus 212 is configured to receive the second information without via the electrical communication wiring W, while the information receiver 44 is configured to receive the first information via the electrical communication wiring W.

With the wireless bicycle communication system 242 according to the third embodiment, it is possible to wirelessly transmit information relating to various bicycle components of the bicycle 10 to the cyclocomputer CC as well as the first embodiment.

The wireless bicycle communication apparatus 212 and the battery device B include the information receiver 44 and the PLC device 116 as a communication interface; however, the information receiver 44 can be shared with the battery device B as the communication interface of the bicycle component BC1. Furthermore, the microcomputer 114 can be integrated into the wireless bicycle communication apparatus 212.

Fourth Embodiment

A wireless bicycle communication system 342 in accordance with the fourth embodiment will be described below referring to FIGS. 13 and 14. The wireless bicycle communication system 342 has the same configuration as the wireless bicycle communication system 42 except that a wireless bicycle communication apparatus 312 according to the wireless bicycle communication apparatus 12 is integrated into one of the bicycle components. Thus, elements having substantially the same function as those in the first embodiment will be numbered the same here, and will not be described again in detail here for the sake of brevity.

Figure 13:
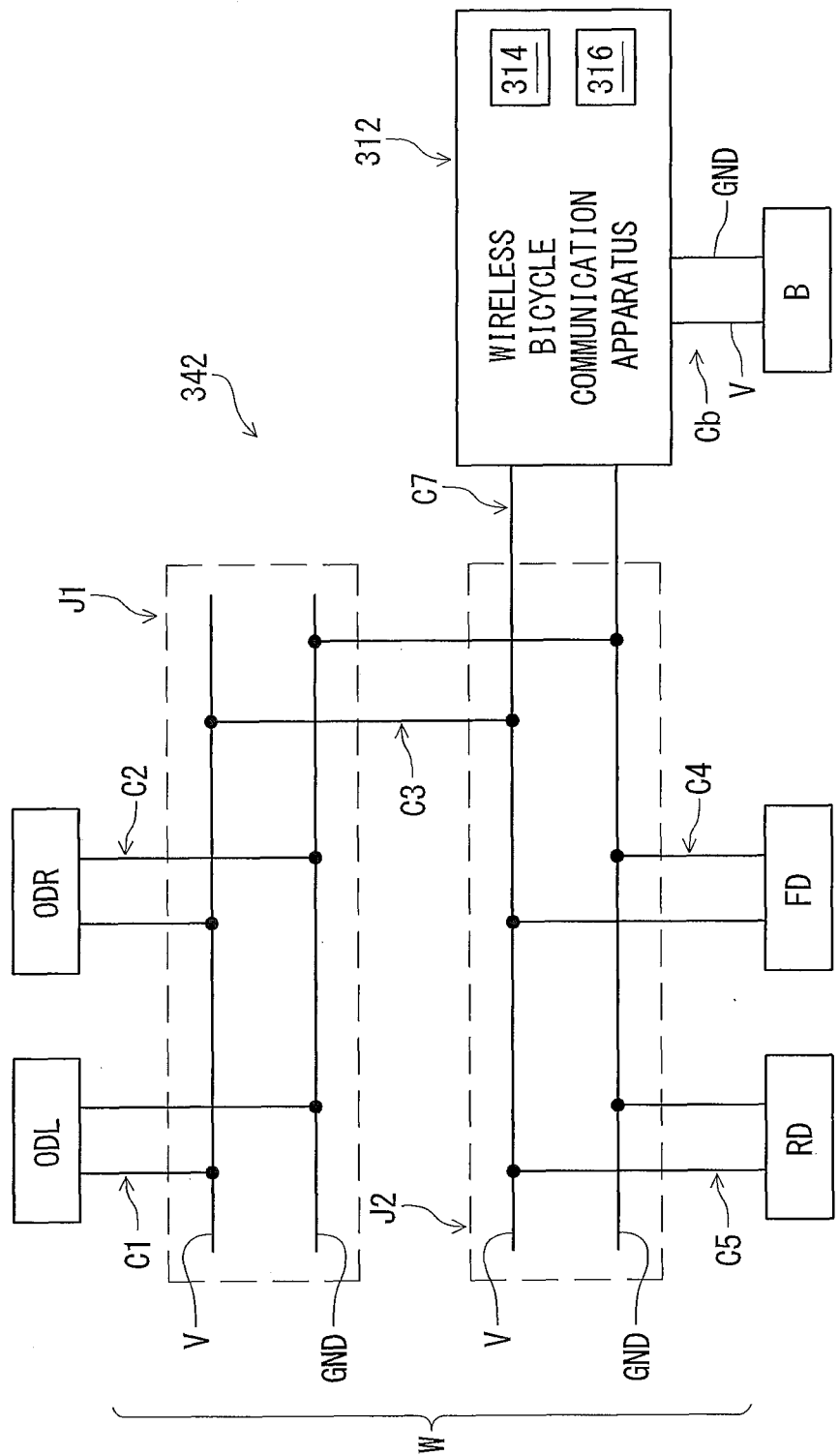
FIG. 13 is a block diagram showing an electric component connection structure of a wireless bicycle communication system in accordance with a fourth embodiment.

As seen in FIG. 13, the wireless bicycle communication apparatus 312 according to the fourth embodiment further comprises a first detector 314. The first detector 314 is configured to detect third information indicating a rotational state of the bicycle wheel. In the illustrated embodiment, the first detector 314 is configured to detect a rotational speed of the rear wheel 22 as the third information as well as the speed sensor SS (FIG. 2). Namely, the speed sensor SS is integrated into the wireless bicycle communication apparatus 312.

Furthermore, the wireless bicycle communication apparatus 312 according to the fourth embodiment further comprises a second detector 316. The second detector 316 is configured to detect fourth information indicating a rotational state of the bicycle crank 30. In the illustrated embodiment, the second detector 316 is configured to detect a rotational speed of the bicycle crank 30 as the fourth information as well as the cadence sensor CS (FIG. 2). Namely, the cadence sensor CS is integrated into the wireless bicycle communication apparatus 312. The wireless bicycle communication apparatus 312 is detachably attached to the chain stay 14b of the bicycle frame 14 (FIG. 1) at a position similar to the positions of the speed sensor SS and the cadence sensor CS, for example.

Figure 14:
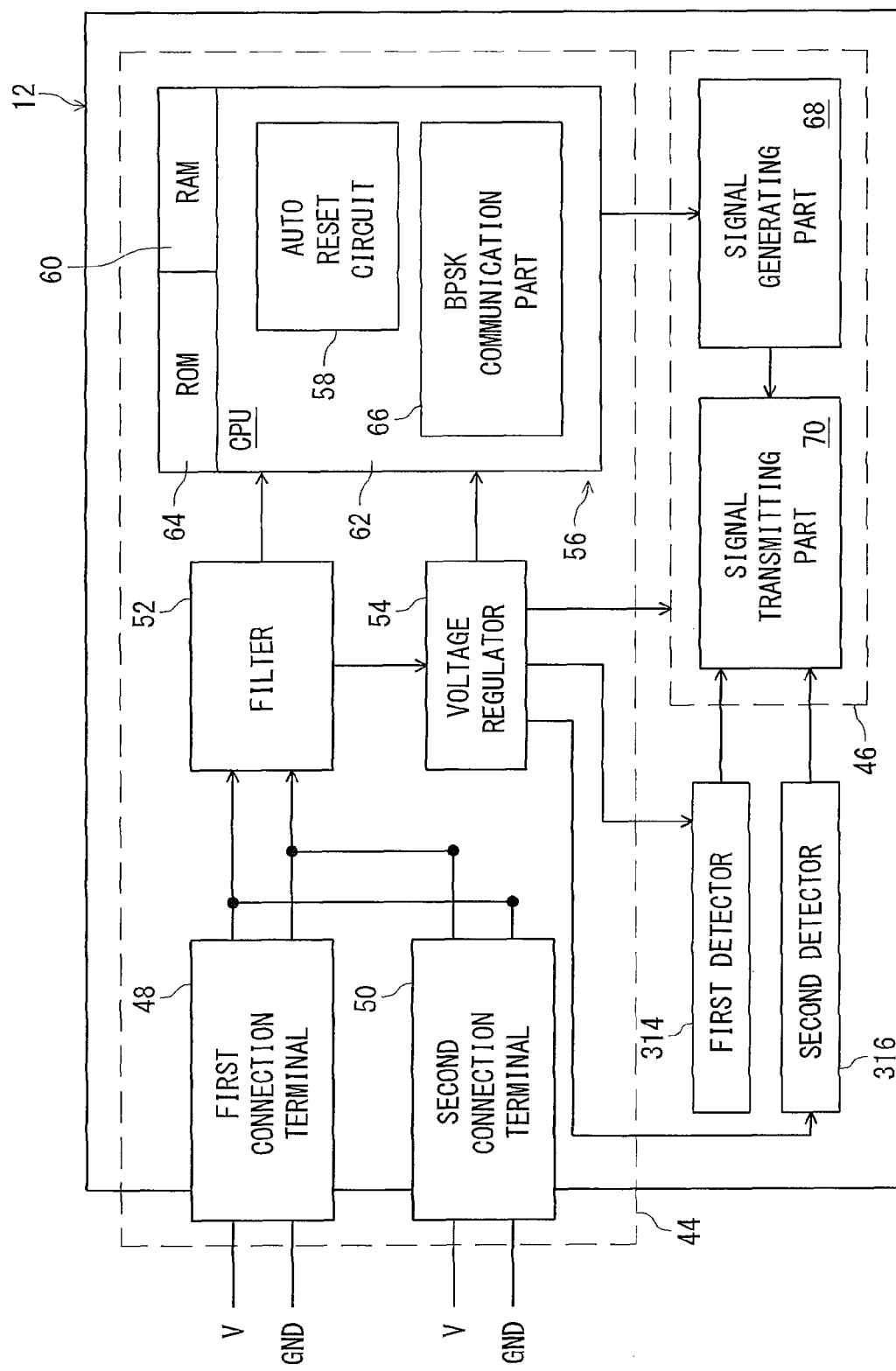
FIG. 14 is a schematic block diagram of a wireless bicycle communication apparatus in accordance with the fourth embodiment.

As seen in FIG. 14, the voltage regulator 54 supplies the regulated electric power to the first detector 314 and the second detector 316. Each of the first detector 314 and the second detector 316 is electrically connected to the wireless transmitter 46. The wireless transmitter 46 is configured to periodically transmit the wireless signals based on the third information detected by the first detector 314. The wireless transmitter 46 is configured to periodically transmit the wireless signals based on the fourth information detected by the second detector 316. In the illustrated embodiment, the wireless bicycle communication apparatus 312 is configured to wirelessly transmit the rotational speed of the rear wheel 22 and the rotational speed of the bicycle crank 30 in addition to the first information (e.g., the shift information) and the second information (e.g., the battery information).

With the wireless bicycle communication apparatus 312 according to the fourth embodiment, it is possible to wirelessly transmit information relating to various bicycle components of the bicycle 10 to the cyclocomputer CC as well as the first embodiment.

The wireless bicycle communication apparatus 312 includes the first detector 314 and the second detector 316; however, one of the first detector 314 and the second detector 316 can be omitted from the wireless bicycle communication apparatus 312 if needed and/or desired in the fourth embodiment. Namely, at least one of the speed sensor SS and the cadence sensor CS can be integrated into the wireless bicycle communication apparatus 312.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A wireless bicycle communication apparatus comprising:

an information receiver configured to receive first information and second information from a first bicycle component and a second bicycle component, the first information relating to the first bicycle component, the second information relating to the second bicycle component, the information receiver being configured to receive at least one of the first information and the second information via an electrical communication wiring via which a power source voltage is supplied to the information receiver; and a wireless transmitter configured to periodically transmit wireless signals based on the first information and the second information.

2. The wireless bicycle communication apparatus according to claim 1, wherein the electrical communication wiring includes an electrical cable, and the information receiver includes a first connection terminal configured to be detachably connected to the electrical cable.

3. The wireless bicycle communication apparatus according to claim 2, wherein the electrical communication wiring includes an additional electrical cable, and the information receiver includes a second connection terminal configured to be detachably connected to the additional electrical cable.

4. The wireless bicycle communication apparatus according to claim 1, wherein the first bicycle component is configured to be in a state changeable among a plurality of states, the second bicycle component is configured to be in a state changeable among a plurality of states, the first information includes information indicating a state of the first bicycle component, and the second information includes information indicating a state of the second bicycle component.

5. The wireless bicycle communication apparatus according to claim 1, wherein the wireless transmitter includes a signal generating part configured to generate the wireless signals based on the first information and the second information, and a signal transmitting part configured to periodically transmit the wireless signals generated by the signal generating part.

6. The wireless bicycle communication apparatus according to claim 5, wherein the signal generating part is configured to encrypt the first information and the second information to generate encrypted wireless signals, and the signal transmitting part is configured to periodically transmit the encrypted wireless signals.

7. The wireless bicycle communication apparatus according to claim 1, wherein the first bicycle component comprises a transmission configured to shift gears, the first information includes shift information indicating which gear is selected by the transmission, and the information receiver is configured to receive the shift information as the first information from the transmission via the electrical communication wiring.

8. The wireless bicycle communication apparatus according to claim 1, wherein the second bicycle component comprises a battery device configured to supply electric power to the first bicycle component, the second information includes battery information indicating a battery residual capacity of the battery device, and the information receiver is configured to receive the battery information as the second information from the battery device via the electrical communication wiring.

9. The wireless bicycle communication apparatus according to claim 1, further comprising:

a first detector configured to detect third information indicating a rotational state of a bicycle wheel, wherein the wireless transmitter is configured to periodically transmit the wireless signals based on the third information.

10. The wireless bicycle communication apparatus according to claim 1, further comprising:

a second detector configured to detect fourth information indicating a rotational state of a bicycle crank, wherein the wireless transmitter is configured to periodically transmit the wireless signals based on the fourth information.

11. The wireless bicycle communication apparatus according to claim 1, wherein the information receiver is configured to receive, via the electrical communication wiring, the at least one of the first information and the second information which is superimposed on the power source voltage.

12. A wireless bicycle communication system comprising:

a first bicycle component;

a second bicycle component;

an electrical communication wiring; and a wireless bicycle communication apparatus comprising:

an information receiver configured to receive first information and second information from the first bicycle component and the second bicycle component, the first information relating to the first bicycle component, the second information relating to the second bicycle component, the information receiver being configured to receive at least one of the first information and the second information via the electrical communication wiring via which a power source voltage is supplied to the information receiver; and a wireless transmitter configured to periodically transmit wireless signals based on the first information and the second information.

13. The wireless bicycle communication system according to claim 12, wherein the electrical communication wiring includes an electrical cable, and the information receiver includes a first connection terminal configured to be detachably connected to the electrical cable.

14. The wireless bicycle communication system according to claim 13, wherein the electrical communication wiring includes an additional electrical cable, and the information receiver includes a second connection terminal configured to be detachably connected to the additional electrical cable.

15. The wireless bicycle communication system according to claim 12, wherein the first bicycle component is configured to be in a state changeable among a plurality of states, the second bicycle component is configured to be in a state changeable among a plurality of states, the first information includes information indicating a state of the first bicycle component, and the second information includes information indicating a state of the second bicycle component.

16. The wireless bicycle communication system according to claim 12, wherein
the wireless transmitter includes
a signal generating part configured to generate the wireless signals based on the first information and the second information, and
a signal transmitting part configured to periodically transmit the wireless signals generated by the signal generating part.

17. The wireless bicycle communication system according to claim 16, wherein
the signal generating part is configured to encrypt the first information and the second information to generate encrypted wireless signals, and
the signal transmitting part is configured to periodically transmit the encrypted wireless signals.

18. The wireless bicycle communication system according to claim 12, wherein
the first bicycle component comprises a transmission configured to shift gears,
the first information includes shift information indicating which gear is selected by the transmission, and
the information receiver is configured to receive the shift information as the first information from the transmission via the electrical communication wiring.

19. The wireless bicycle communication system according to claim 18, wherein
the second bicycle component comprises a battery device configured to supply electric power to the first bicycle component,
the second information includes battery information indicating a battery residual capacity of the battery device, and
the information receiver is configured to receive the battery information as the second information from the battery device via the electrical communication wiring.

20. The wireless bicycle communication system according to claim 12, further comprising:
a first detector configured to detect third information indicating a rotational state of a bicycle wheel, wherein
the wireless transmitter is configured to periodically transmit the wireless signals based on the third information.

21. The wireless bicycle communication system according to claim 12, further comprising:
a second detector configured to detect fourth information indicating a rotational state of a bicycle crank, wherein
the wireless transmitter is configured to periodically transmit the wireless signals based on the fourth information.

22. The wireless bicycle communication system according to claim 12, wherein
the information receiver is configured to receive, via the electrical communication wiring, the at least one of the first information and the second information which is superimposed on the power source voltage.

* * * * *